Oct. 14, 1941.   L. E. LA BRIE   2,258,897
MECHANICAL SERVO BRAKE
Filed July 26, 1935   5 Sheets-Sheet 1

INVENTOR.
LUDGER E. LA BRIE
BY
ATTORNEY

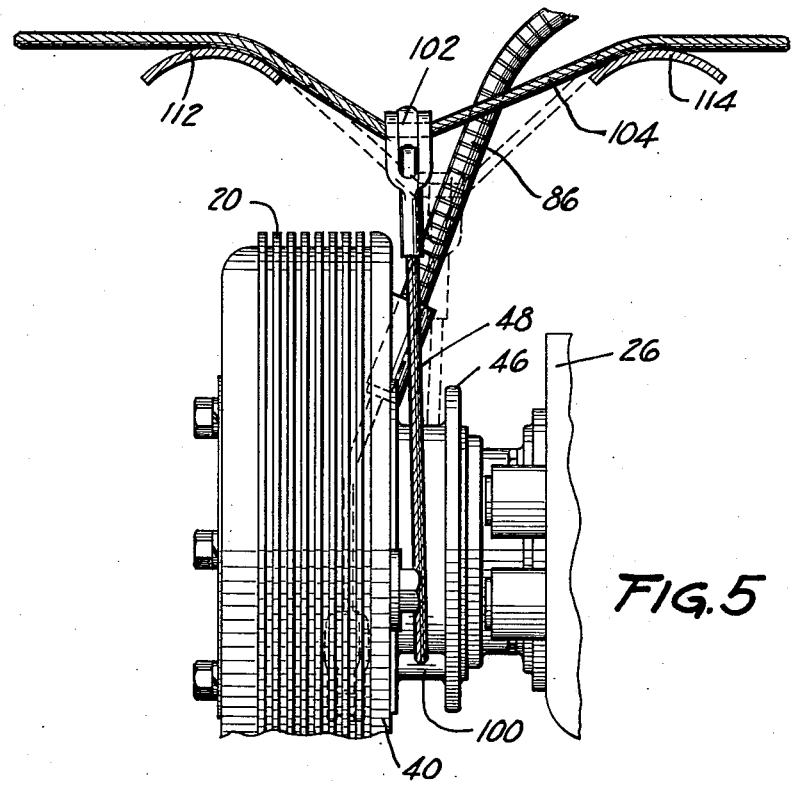
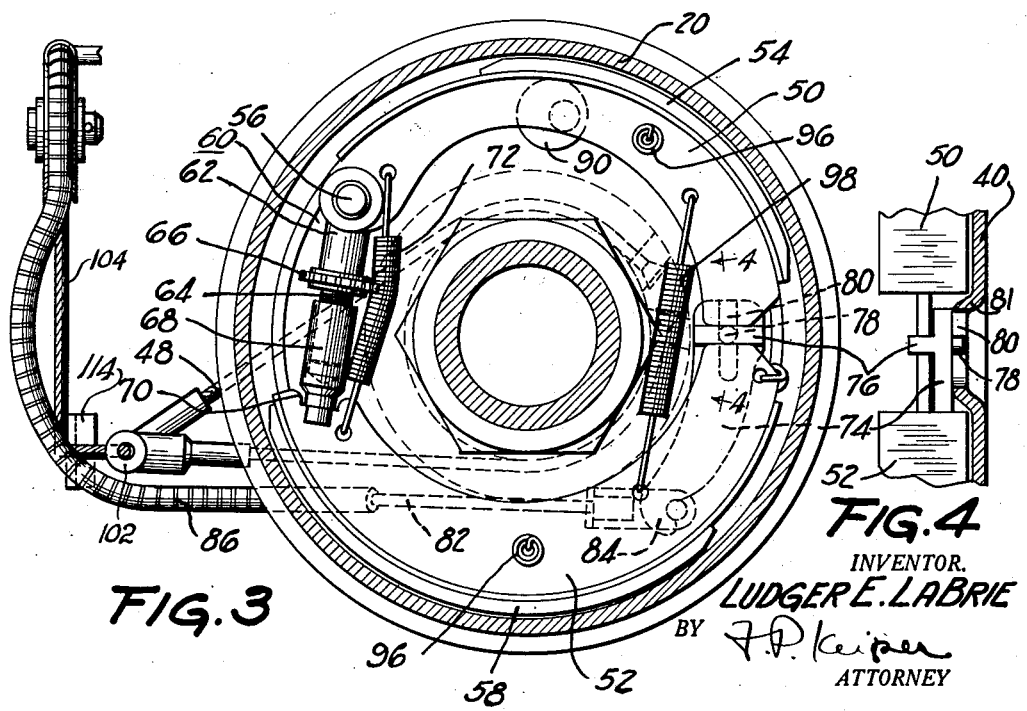

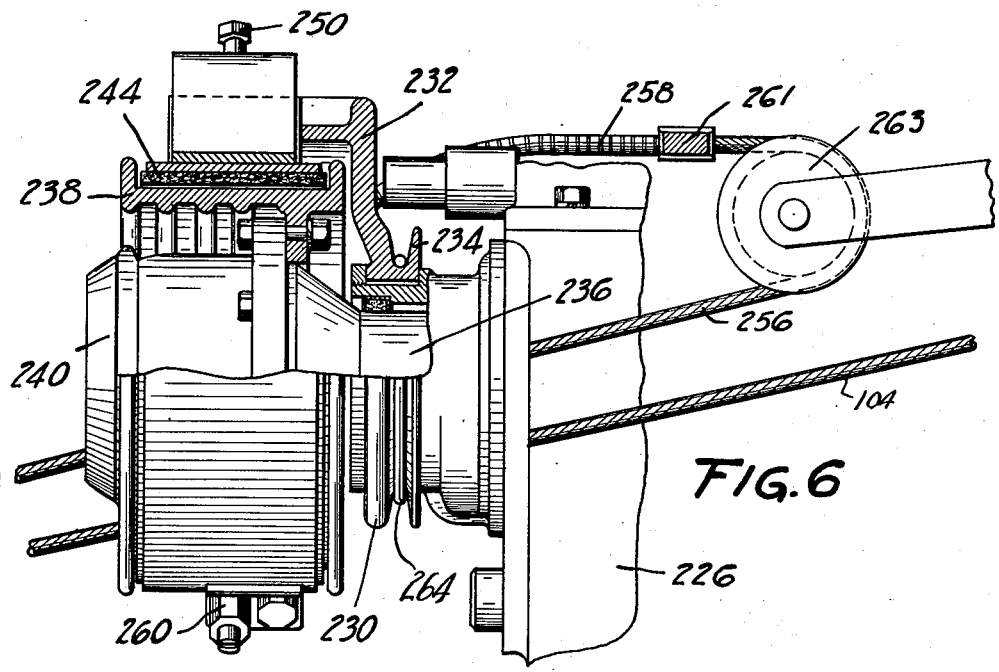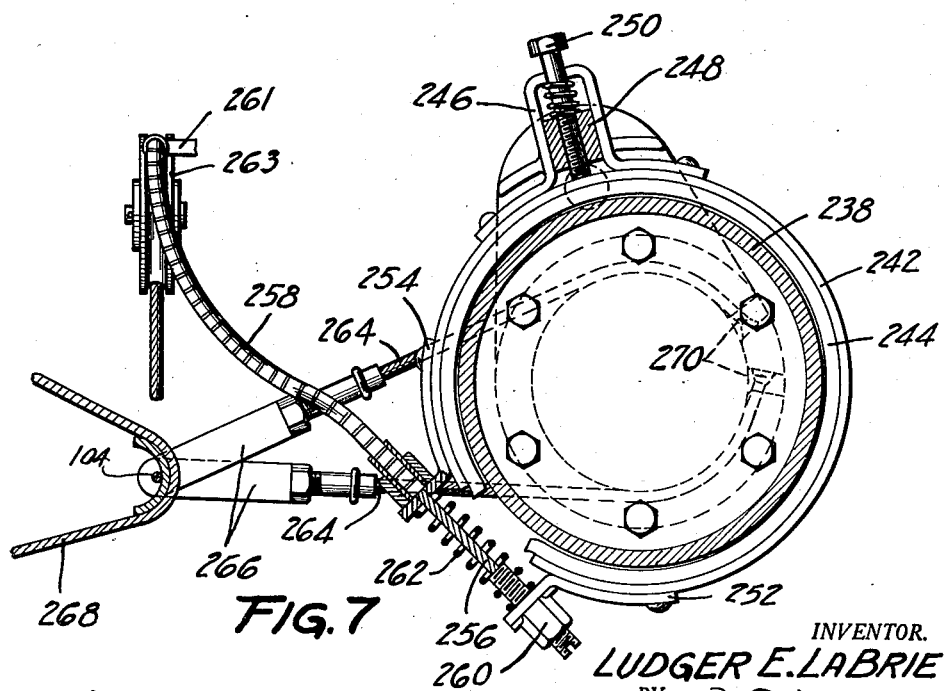

INVENTOR.
LUDGER E. LA BRIE
ATTORNEY

Oct. 14, 1941.  L. E. LA BRIE  2,258,897
MECHANICAL SERVO BRAKE
Filed July 26, 1935  5 Sheets—Sheet 5

INVENTOR.
LUDGER E. LaBRIE
BY
ATTORNEY

Patented Oct. 14, 1941

2,258,897

UNITED STATES PATENT OFFICE 2,258,897

MECHANICAL SERVO BRAKE

Ludger E. La Brie, South Bend, Ind., assignor to Bendix Products Corporation, South Bend, Ind., a corporation of Indiana Application July 26, 1935, Serial No. 33,301

8 Claims. (Cl. 188—140)

This invention relates to brakes for motor vehicles and more particularly to power means for operating vehicle brakes, where the power is derived from some rotating part of a vehicle, preferably a drive member which is in constant drive relation with the vehicle wheels.

As is well understood in the art, the operation of vehicle brakes, requires considerable expenditure of energy upon the part of the operator, particularly where the vehicle is of the heavier type. The invention has to do with providing a mechanism for employing the energy of the moving vehicle for applying the brakes, the mechanism including an operator controlled friction device adapted to take off a brake operating torque from the propeller shaft of a vehicle or some other rotating part from which a brake operating torque may be obtained. More particularly the invention has to do with the employment of a drug type friction device for developing torque and linkage for suitably controlling the torque and applying the same to wheel brakes.

Accordingly an object of the invention is to provide an improved friction device including a control therefor for developing a brake operating torque and means for transmitting the torque to the vehicle brakes.

Another object of the invention is to provide a friction device for engagement with a rotating drum which device may transfer torque from the rotating drum to energize a brake linkage to any desired degree in accordance with the actuation of a control member.

A further object of the invention is to provide in a friction device of the drum type for developing energy for actuating wheel brakes, a control therefor which will require a movement or energy which may always be substantially proportional to the energy to be applied to the wheel brakes by the friction device.

The above and other novel features of the invention will appear more fully hereinafter from the following detailed description when taken in conjunction with accompanying drawings. It is expressly understood, however, that the drawings are employed for purposes of illustration only and are not designed as a definition of the limits of the invention, reference being had for this purpose to the appended claims.

In the drawings wherein like reference numerals indicate like parts:

Fig. 3 is an end elevation of the relatively stationary friction parts of Fig. 1, together with the rotary drum, the head of the drum being removed;

Fig. 4 is a section taken on line 4—4 of Fig. 3 showing the actuating cam therein and its mounting.

Fig. 5 is a top plan view of a portion of the torque developing element of Fig. 1 illustrating a method of transmitting developed torque to a brake linkage;

Fig. 6 is a modified form of the invention employing an external contracting friction band;

Fig. 7 is an end elevation of the modification of Fig. 6 with the brake drum flange removed;

Figure 1:
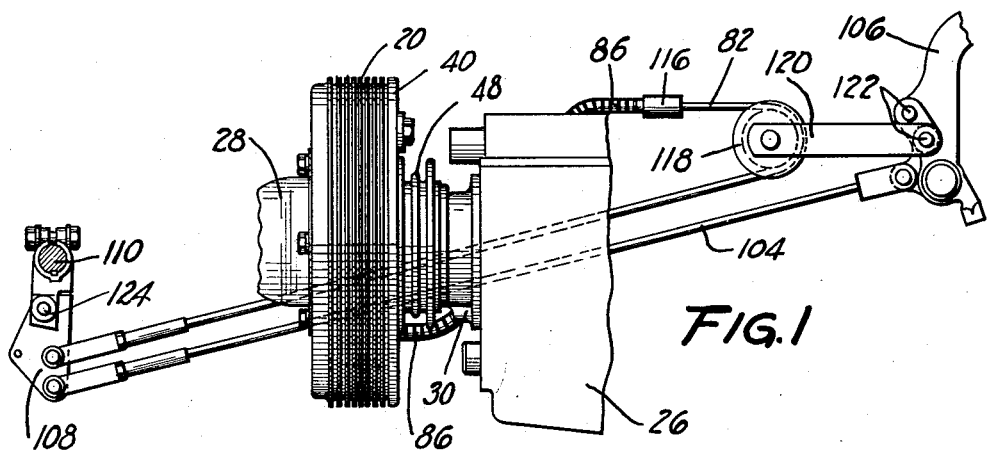
Fig. 1 illustrates a side elevation of a form of power take off of the internal expanding friction shoe type.
Figure 2:
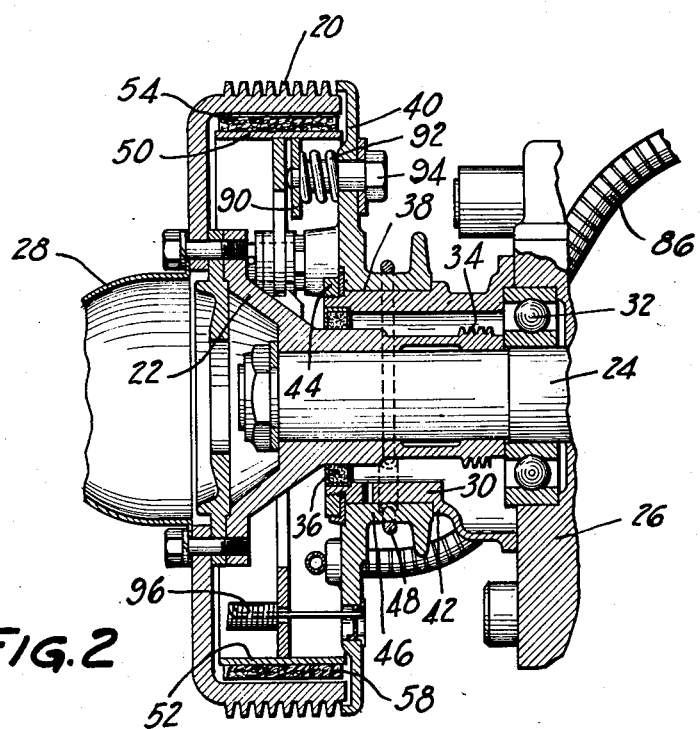
Fig. 2 is a vertical section taken through Fig. 1.

Referring to the drawings and particularly Figs. 1-5 inclusive, there is shown a rotatable friction drum 20, mounted for rotation with the propeller shaft of a vehicle, the drum in the embodiment shown being mounted on a flange plate 22 drivably connected to a shaft 24 emerging from the back side of a transmission gear box 26. The flange plate 22 may carry a universal joint housing 28 and drive a universal joint, not shown, housed therein, which latter is generally connected to a propeller shaft of the vehicle. It will readily be understood that the propeller shaft is preferably normally geared to certain wheels of the vehicle and must rotate with the wheels, thereby forming a reliable source of power for brake operation whenever the vehicle is moving.

Secured to the back side of the gear box 26 is a housing and support sleeve 30, which encloses the bearing 32, speedometer drive worm 34 and carries a grease retaining ring 36 to prevent the escape of transmission lubricant into the drum 20. The support sleeve, on the outside thereof is provided with a cylindrical bearing surface 38 upon which is rotatably carried a backing plate or support and end closure 40 for the drum, the backing plate 40 being retained on the bearing surface 38 by a shoulder 42, and a threaded collar 44.

The backing plate 40 is provided with a drum flange 46 to which is secured and about which may be wrapped an operating cable 48 hereinafter more fully described. The backing plate also carries friction shoes 50 and 52 for engaging the internal surface of the drum 28. The friction shoe 50 is shown as of T section and provided with a lining 54, and anchored on a pin 56 secured to the backing plate. The friction shoe 52, also of T section is provided with a relatively longer friction lining 58 and is adapted to anchor upon the pin 56 through an adjustment 60 comprising a clevis member 62 pivoted on said anchor, a screw member 64 rotatably mounted in said clevis member 62 and including a notched or star wheel 66 for adjustment and a threaded socket member 68 notched to receive the notched end 70 of the shoe 52. A tension spring 72 connecting the shoes 50 and 52 and retaining shoe 52 in engagement with the adjustment also serves as a resilient detent to prevent rotation of the star wheel 66 except as desired.

To spread the friction shoes into engagement with the drum a lever and cam member 74 is provided, the same having a raised cam portion 76 arranged between the ends of the shoes 50 and 52. A stub 78 extending from the back side of the lever behind the cam is pivoted in a tangential slot 80 provided in a raised portion 81 of the backing plate. The outer end of the lever is provided with a hook 84 for receiving a flexible cable 82, having a flexible conduit 86 which may as shown in Fig. 5 extend through the backing plate at an angle. It will appear that the cable extends at right angles to the slot 80 in the backing plate, and that the flexible cable and conduit permit the necessary slight rotation of the backing plate during operation of the brake.

For adjustment, in addition to the link 60, an eccentric 90 is arranged in the backing plate adjacent the shoe 50 and by means of the spring 92 and head 94 may be frictionally held in any desired set position so that the eccentric cam may fix the release position of the shoe. One or more hold down springs 96 may be applied to the shoes to retain them slidably against the backing plate and a return spring 98, adapted to urge the shoes to the "release position" connects the two shoes and urges them into cam engagement.

Referring more in detail to the actuating linkage for transmitting the torque developed by the friction device hereinabove described in Fig. 5, the cable 48 is shown as wrapped around the drum 46 and secured thereto as at 100. The ends of the drum cable are in turn secured together and around a brake operating cable 104 by means of suitable end fittings 102. The brake operating cable, as shown in Fig. 1, may extend to a short lever arm on the brake pedal 106 and to a long lever arm 108 on a brake operating cross shaft 110. The brake operating cable, adjacent the point of its attachment to the drum cable 48 may pass over a pair of spaced rounded guide members 112 and 114, which will prefereably be greased to avoid friction.

In order that the pedal pressure and movement may be proportional to the degree of application of the vehicle brakes, the control cable 82 which actuates the internal expanding friction shoes, is according to this modification, after emerging from the end 116 of the flexible conduit, passed over a pulley 118 and thence to the lever 108 on the brake operating cross shaft 110. The pulley, through a link 120 is attached to the brake pedal 106 in either of a series of holes 122, so that the effective lever length can be readily varied or adjusted. As will be well understood in the art the conduit end 116 of the conduit 86 will be fixed relative to the brake pedal by some suitable rigid support, which, however, of course, may be adjustable in position, as desired. Also it will appear that the lever 108 on the cross shaft 110 may be of the pivoted type having a knee 124 so that the brake cross shaft may be operated by another source such as the well known hand or emergency lever, thereby overrunning the power operated linkage.

Operation of the power brake will readily be understood from the foregoing description. Movement of the brake pedal 106 in a clockwise direction will tension the cable 82, actuating the cam 76 and frictionally expanding the friction shoes 50 and 52 into engagement with the drum. Assuming the vehicle to be underway and the drum 28 to be rotating, a torque proportional to the pressure of shoe engagement will be produced which will tend to rotate the support plate 40 and its drum 46 on the support sleeve 30, thereby tensioning one end or the other of the drum cable 48 and slackening the other end, depending of course on the direction of rotation of the drum 28 and the direction of movement of the motor vehicle.

The tensioning of the drum cable 48 acts to tension the brake operating cable 104, thereby actuating the lever 108 and rotating the brake cross shaft 110. The brake operating cable is also connected to the brake pedal 106 and a short lever arm so that some "feel" may be transmitted to the brake pedal. So that the pedal travel may be proportional to the brake application, upon movement of the brake cross shaft lever 108, the control cable 82 passes over a pulley 118 and thence to the brake cross shaft lever so that as fast as the vehicle brakes are applied the cable 82 is slackened so that it becomes necessary to further apply the brake pedal. It will, of course, be understood that the links may be suitably adjusted so that the degree of pedal travel may be arranged to suit individual operating tastes. Since many wheel brakes act differently when operated in one direction than in the other, it may be desirable to change the extent of the brake lining on the shoes 50 or 52 so that the friction device may develop more or less torque in one direction than the other to compensate for the inequalities in the wheel brake or to give a warning in reverse braking of brake wear.

Referring to Figs. 6 and 7 illustrating a modified form of the invention, there is shown a power take-off employing a friction device of the external contracting type. Referring more in detail, there will appear the usual transmission casing 220 on the rear of which is mounted a support sleeve 230 which carries a support bracket 232 which has a drum flange 224 carried on the support sleeve 230. The shaft 236 extending from the transmission box is provided with a brake drum 238 which may, as shown, surround the usual universal joint 240 coupling the shaft 236 with the usual propeller shaft, not shown. The brake drum 238 is surrounded by a band 242 carrying a friction lining 244 which band is provided with a U-shaped guide and anchor engaging member 246 arranged about an axially extending anchor pin 248 carried on the support bracket 232. The screw 250 threaded in the anchor pin 248 is adapted to adjust the friction band relative to the rotating drum and take up for wear.

The free ends of the friction band 242 are provided with brackets 252 and 254 to which are attached a flexible cable 256 and conduit 258 respectively. The cable is adjustably carried by the bracket 252 by reason of the nut 260 and a spring 262 is arranged about the cable 256 between the brackets to release the friction shoe from engagement with the drum. The conduit 258 is rigidly supported at 261 and the cable may extend therefrom about a pulley 263 actuated by the brake pedal. About the drum 234 on the anchor carrying bracket 232 is a flexible drum cable 264, the ends of which are provided with fittings 266 for engagement with a brake actuating cable 104 which may pass over guide member 268 adjacent its point of attachment to the drum cable 264. The drum cable 264 is suitably fixed to the drum as at 270 so that no slippage may occur. The brake operating cable 104 and the cable 256 which applies the friction band in conjunction with the conduit 258 may be preferably connected to a vehicle brake cross shaft lever as shown in Fig. 1, at 110 and 108 and a brake pedal 106 as will be well understood from the description of these parts appearing above.

The operation of the modification shown in Figs. 6 and 7 will be the same as that of the modification shown in Figs. 1 to 5 since it will appear that tensioning of the cable 256 will cause the friction band 242 to engage the drum 238 which, if rotating, will transmit a torque to the anchor bracket 232 and the drum 234 thereby tensioning one end or the other of the cable 264.

Figure 8:
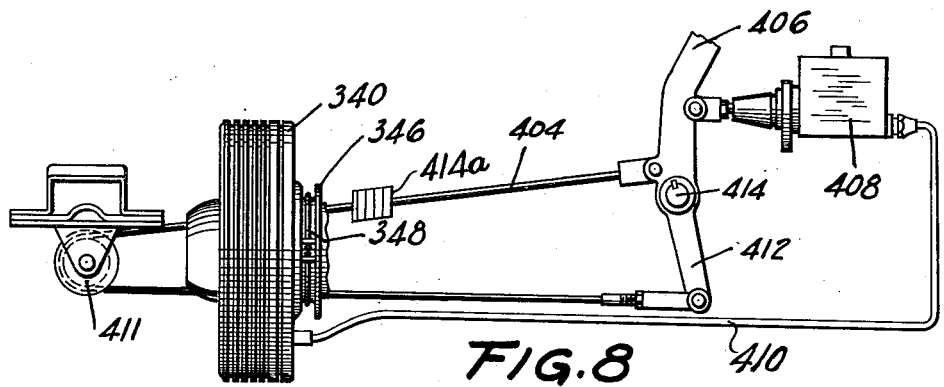
Fig. 8 shows diagrammatically a further modification employing hydraulic control.
Figure 9:
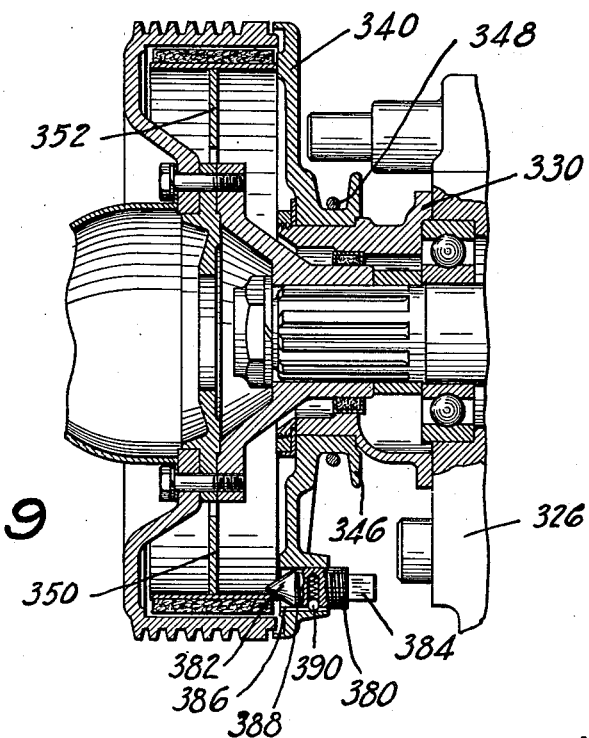
Fig. 9 is a vertical section of the torque developing portion of Fig. 8.

In Figs. 8 through 11, a further modified form of invention with two variations is shown wherein the control of the friction device is accomplished hydraulically. Referring to Fig. 9, the transmission casing 326 is again illustrated as having a support collar 330 about which a backing plate or support disc 340 is mounted. The backing plate is also provided with a drum flange 346 about which is wrapped a cable 348. Mounted on the backing plate 340 are a pair of shoes 350, 352 carried on an anchor pin 356. Diametrically opposite the anchoring pin there is provided a hydraulic cylinder 358 having pistons 360 therein and cup washers 362, the latter being held in place by a coil spring 364 axially arranged within the cylinder. The pistons 360 on their outer side are adapted to engage tongues 368 and 370 on the ends of the friction shoes 350 and 352 respectively. Return springs 372 and 374 are provided for the shoes in order to maintain them normally in non-engaged position.

In order to fix the release position of the brake shoes a novel adjustment is provided for each shoe adjacent the free end thereof and carried in a backing plate. The adjustment consists of a threaded pin 380 having a conical end 382 adapted to engage an edge of the shoe 350, the pin having an exposed end 384 conveniently shaped to fit a spanner. The backing plate is provided with a threaded hole 386 to receive the pin and is also provided with an axially extending groove 388 into which a spring pressed ball 390 may seat thus tending to lock the adjustment against undesired movement. It will, of course, be understood that the groove 388 is only of sufficient depth to act as a detent but of insufficient depth to prevent the ball from being thrust inwardly whenever the pin is turned by a spanner.

Figure 10:
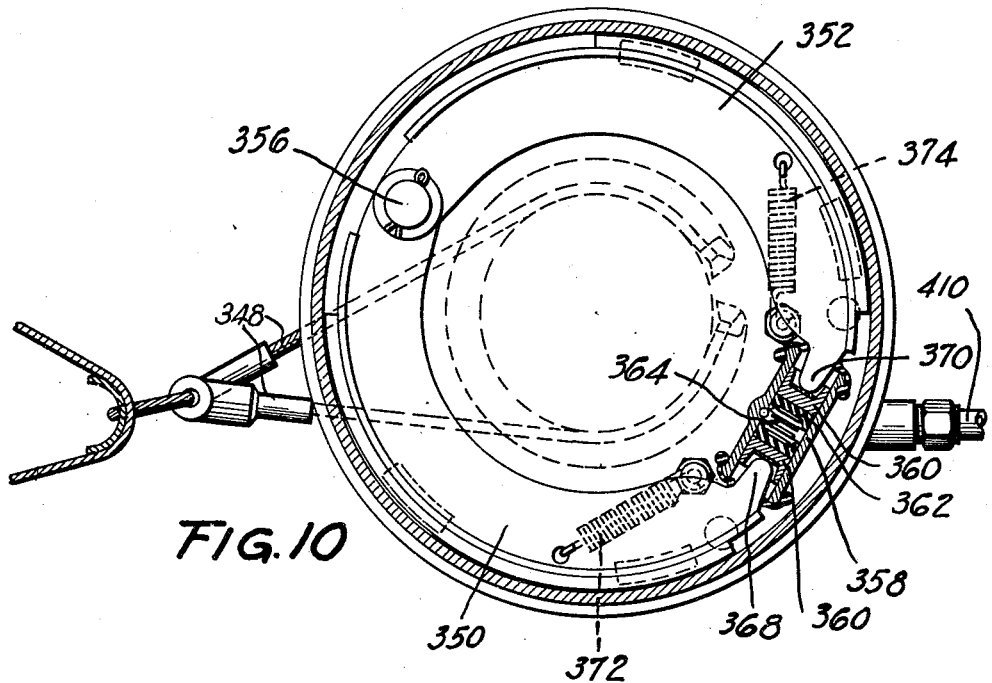
Fig. 10 is an end elevation of the modification of Figs. 8 and 9 with the brake drum head removed.

As shown in Fig. 8, the brake lever 406 is adapted to operate the master cylinder 408 which is connected through a flexible conduit 410 to the brake cylinder 358. The pedal is also connected through a cable 404 around a pulley 411 and back to a lever 412 oppositely directed from the brake pedal 406 but rigid therewith. The drum cable 348 as best shown in Fig. 10, which is secured on the drum 346 engages the cable 404 in the manner shown in Fig. 5 and tightens the cable 404 around guide member 414a upon operation of the friction power take-off. The wheel brakes may be connected to the lever 412 or to the cross shaft 414 which rotates as a part thereof.

Figure 11:
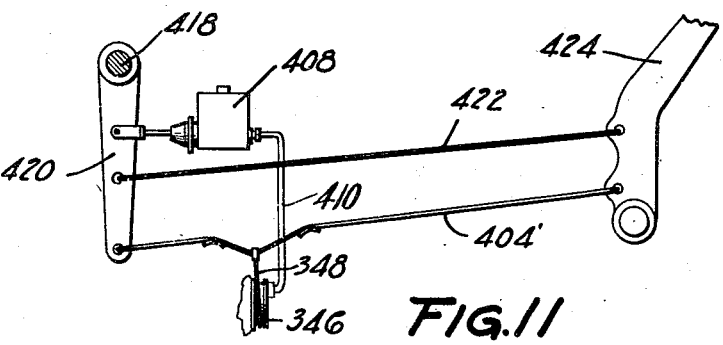
Fig. 11 is a diagrammatic illustration of another form of linkage employed with the hydraulic control of Figs. 7-9 inclusive.

In Fig. 11 a modified form of hook-up is shown wherein the master cylinder is operated by separate cross shaft lever 420, in this case a cross shaft lever 420 being actuated indirectly through the link 422 to the brake control pedal 424. It will obviously appear that upon rotation of the lever 420 about the cross shaft 418 that hydraulic fluid will be expelled from cylinder 408 which will, in turn, actuate the friction device in producing torque on drum 346 thereby tensioning the cable 404' and applying power to the cross shaft lever 420.

The operation of the structure of Figure 8 is similar to the operation of the previous modifications. Depression of the pedal lever 406 forces hydraulic fluid from master cylinder 408 into the motor cylinder 358 to expand the shoes 350 and 352 against the drum. Rotation of the drum tends to rotate the plate 340 tensioning one or the other ends of cable 348 and tightening the tension member 404. The pull on the tension member 404 exerts force at two points. One end of the element 404 rotates the lever 412 in a clockwise direction. This effects the turning of cross shaft 414 to apply the road wheel brakes through suitable mechanical linkage. Since the levers 412 and 406 are rigidly connected, this motion of lever 412 moves lever 406 to apply further pressure to the fluid in master cylinder 408. The other end of the tension member 404 is attached to lever 406 and tends to rotate that lever in a counterclockwise direction, thus opposing the brake-applying rotation of the cross shaft 414. This opposing force exerted on lever 406 is proportional to the force exerted by the servo mechanism, and is therefore proportional also to the force applied to lever 412 to actuate the wheel brakes. Since the opposing, or reaction force, works on a comparatively small leverage, the reaction or feel on the operator's foot is a small percentage of the brake-applying force. Since the forces acting around the shaft 414 will tend to reverse the direction of rotation of the cross shaft unless the operator continues to move the pedal lever 406 in a clockwise direction, the distance of pedal travel will be proportionate to the degree of brake application.

The operation of the modification of Figure 11 is much the same. Clockwise rotation of the pedal lever 424 by the operator will swing the lever 420 in a counterclockwise direction about the shaft 418. Rotation of the shaft 418 begins the application of the wheel brakes. At the same time, fluid is displaced from the master cylinder 408, through the conduit 410, into the hydraulic motor spreading the shoes of the servo brake mechanism into contact with the drum. Rotation of the drum turns the plate 346, tensioning the cable 348 and tightening the tension member 404'. Thus a brake-applying force is applied to the lever 420 and a reaction force is applied to the pedal lever 424, tending to oppose movement thereof, unless the operator exerts greater force thereon and moves the pedal lever a further distance in a clockwise direction to further apply the brakes.

It will thus be seen that a power brake is provided wherein the brake pedal moves in proportion to the actuation of the vehicle brakes and wherein the pedal pressure is likewise proportioned to the brake actuation, the power source for brake operation being derived from rotation of some part of the vehicle transmission separate from the wheels themselves. It will be readily appreciated that such an arrangement affords unlimited power so that brakes of a simple form may be employed whose characteristics are well known and easily controlled.

Although several modifications of the invention have been illustrated and described it should be understood that the invention is not limited thereto but may be embodied in other mechanical arrangements and forms. For example, the various features of any one of the modifications might be substituted for those of the other modifications. As such and other changes in construction and arrangement may be made without departing from the spirit of the invention as will be apparent to those skilled in the art, reference will be had to the appended claims for a definition of the limits of the invention.

What is claimed is:

1. In a mechanical servo power brake, a friction drum rotatable by the wheels of a vehicle, friction means radially movable for engaging said drum, a support for said friction means rotatable in either direction, means to apply said friction means to the drum, a vehicle brake linkage actuated in one direction by rotation of said support means in either direction, and a reaction connection between said applying means and said vehicle brake linkage.

2. In a power brake, a power driven rotatable member, a friction device for engaging said member, means for transmitting the torque derived from the friction device to apply a brake independent thereof, hydraulic means for engaging said friction device with the rotatable member, an operator operated member for applying pressure to said hydraulic means, and means comprising a mechanical reaction connection between the torque transmitting means and the operator operated member separate from said hydraulic means whereby the developed force of the transmitting means may be proportional to that of said hydraulic means.

3. In a power brake, a power driven rotatable member, a friction device for engaging said member, means for transmitting the torque derived from the friction device to apply a brake remote therefrom, hydraulic means for engaging said friction device with the rotatable member in varying degree, and means for operating the hydraulic engaging means and having a reaction connection with the transmitting means whereby the brake applying movement of the operating means may be proportional to the brake applying movement of the transmitting means.

4. In a power brake, a power driven rotatable member, a friction device for engaging said member, means for transmitting the torque derived from the friction device to apply a brake remote therefrom, hydraulic means for engaging said friction device with the rotatable member in varying degree, and means for operating the hydraulic engaging means and having a mechanical reaction connection with the transmitting means separate from said hydraulic means whereby the brake applying movement of the operating means may be proportional to the developed force of the transmitting means.

5. In an automotive vehicle servo power brake, a wheel brake operating cross shaft, a lever thereon, a brake pedal, an operating cable having a short lever connection on the brake pedal and a connection to the cross shaft lever, a power driven rotatable drum member, a friction device adapted to engage said power member, means for transforming the torque derived by said friction device into tension in said operating cable, and control means for engaging said friction device with the rotatable drum member.

6. In an automotive vehicle servo power brake, a wheel brake operating cross shaft, a lever thereon, a brake pedal, an operating cable having a short lever connection on the brake pedal and a connection to the cross shaft lever, a power driven rotatable drum member, a friction device adapted to engage said power member, means for transforming the torque derived by said friction device into tension in said operating cable, and control means for engaging said friction device with the rotatable drum member, said control means having a reaction connection to the cross shaft lever.

7. In a servo power brake a friction drum rotatable by the wheels of a vehicle, friction means radially movable for engagement with said drum, engaging means, a support plate for carrying said friction means and the torque derived thereby from the drum, said support plate being mounted for rotation about the axis of said drum, a cable drum carried by said support plate, tension cables leaving said cable drum tangentially and converging at a point of connection with a common wheel brake operating linkage, said tension cables being secured to said cable drum to wrap and unwrap therewith, an operator operated member for applying pressure to said engaging means, and means comprising a mechanical reaction connection between said tension cables and said operator operated means whereby the developed force transmitted to the brake operating linkage may be proportional to that of the engaging means.

8. In a servo brake, a power driven rotatable member, a friction device for engaging said member, a rockable support for said friction device, means on said support for transforming torque in either direction into tension to operate a brake, means for engaging the friction device with the power driven member, and an operator operated member for applying force to the engaging means having a reaction connection independent of the engaging means with the torque transforming means.

LUDGER E. LA BRIE.